US012614043B2

(12) United States Patent
Zhao et al.

(10) Patent No.: US 12,614,043 B2
(45) Date of Patent: Apr. 28, 2026

(54) MODEL TRAINING METHOD AND APPARATUS, MACHINE TRANSLATION METHOD AND APPARATUS, AND DEVICE AND STORAGE MEDIUM

(71) Applicant: BEIJING YOUZHUJU NETWORK TECHNOLOGY CO., LTD., Beijing (CN)

(72) Inventors: Chengqi Zhao, Beijing (CN); Jianze Liang, Beijing (CN); Mingxuan Wang, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 286 days.

(21) Appl. No.: 18/255,790

(22) PCT Filed: Nov. 17, 2021

(86) PCT No.: PCT/CN2021/131073
§ 371 (c)(1),
(2) Date: Jun. 2, 2023

(87) PCT Pub. No.: WO2022/116819
PCT Pub. Date: Jun. 9, 2022

(65) Prior Publication Data
US 2024/0037349 A1 Feb. 1, 2024

(30) Foreign Application Priority Data
Dec. 4, 2020 (CN) .......................... 202011412735.7

(51) Int. Cl.
*G06F 40/58* (2020.01)
*G06F 40/51* (2020.01)

(52) U.S. Cl.
CPC .............. *G06F 40/58* (2020.01); *G06F 40/51* (2020.01)

(58) Field of Classification Search
CPC ............. Y02D 10/00; G06N 3/04; G06N 3/08
See application file for complete search history.

(56) References Cited

U.S. PATENT DOCUMENTS 10,878,201 B1 * 12/2020 Wuebker .................. G06N 3/08
10,963,652 B2 * 3/2021 Hashimoto ........... G06F 40/117
(Continued)

FOREIGN PATENT DOCUMENTS

CN 106355248 A 1/2017
CN 108829684 A 11/2018
(Continued)

OTHER PUBLICATIONS

Wuebker et al. "Compact Personalized Models for Neural Machine Translation". Proceedings of the 2018 Conference on Empirical Methods in Natural Language Processing, pp. 881-886 Brussels, Belgium, Oct. 31-Nov. 4, 2018 (Year: 2018).*
(Continued)

*Primary Examiner* — Jesse S Pullias
(74) *Attorney, Agent, or Firm* — Faegre Drinker Biddle & Reath LLP

(57) ABSTRACT

Provided are a model training method and apparatus, a machine translation method and apparatus, a device, and a storage medium. The model training method includes the steps described below. Through a neural network pruning technique, a respective influence degree of each parameter in multiple parameters in a first translation model on a translation result in a first field is determined to obtain at least one first parameter and at least one second parameter. By using the first corpus of the first field, the at least one first parameter is trained obtain the second translation model, and
(Continued)

Determine, through a neural network pruning technique, a respective influence degree of each parameter in multiple parameters in a first translation model on a translation result in a first field to obtain at least one first parameter and at least one second parameter — S110

Train, by using a first corpus of the first field, the at least one first parameter of the first translation model to obtain a second translation model, and the at least one second parameter is unchanged during training — S120

Train, by using a target corpus in a target field, a target parameter of the second translation model to obtain a target translation model, and other parameters except the target parameter are unchanged during training — S130 the at least one second parameter remains unchanged. Similarity between a translation result of the second translation model in the first field and a translation result of the first translation model in the first field meets a preset condition.

14 Claims, 4 Drawing Sheets

(56) References Cited

U.S. PATENT DOCUMENTS

| | | | |
|---|---|---|---|
| 2016/0124942 A1 | 5/2016 | Amin et al. | |
| 2020/0242492 A1 | 7/2020 | Goel et al. | |
| 2020/0364412 A1 | 11/2020 | Cheng et al. | |
| 2021/0097144 A1* | 4/2021 | Bapna ..................... | G06F 18/22 |

FOREIGN PATENT DOCUMENTS

| | | | |
|---|---|---|---|
| CN | 109117483 A | 1/2019 | |
| CN | 110555213 A | 12/2019 | |
| CN | 110598848 A | 12/2019 | |
| CN | 111008533 A | 4/2020 | |
| CN | 111104807 A | 5/2020 | |
| CN | 111353545 A | 6/2020 | |
| CN | 111859991 A | 10/2020 | |
| CN | 111859995 A | 10/2020 | |
| CN | 112380883 A | 2/2021 | |
| WO | 2019024050 A1 | 2/2019 | |

OTHER PUBLICATIONS

Gu et al. "Investigating Catastrophic Forgetting During Continual Training for Neural Machine Translation". arXiv:2011.00678v1 [cs.CL] Nov. 2, 2020. (Year: 2020).*

Simianer et al. ("Measuring Immediate Adaptation Performance for Neural Machine Translation". Proceedings of NAACL-HLT 2019, pp. 2038-2046 Minneapolis, Minnesota, Jun. 2-Jun. 7, 2019 (Year: 2019).*

Thompson et al. ("Freezing Subnetworks to Analyze Domain Adaptation in Neural Machine Translation". Proceedings of the Third Conference on Machine Translation (WMT), vol. 1: Research Papers, pp. 124-132 Belgium, Brussels, Oct. 31-Nov. 1, 2018 (Year: 2018).*

International Search Report issued Feb. 7, 2022 in International Application No. PCT/CN2021/131073, with English translation (6 pages).

Search Report issued Jun. 25, 2023 in Chinese Application No. 2020114127357, with English translation (8 pages).

Chaochao Wang, et al., "Translation Similarity Model Based on Bilingual Compositional Semantics," Acta Scientiarum Naturalium Universitatis Pekinensis, vol. 51, No. 2, Mar. 2015, pp. 335-341.

International Search Report for International Application No. PCT/CN2021/117199, mailed Dec. 17, 2021, 5 pages.

Written Opinion for International Application No. PCT/CN2021/131073, mailed Feb. 7, 2022, 09 Pages.

* cited by examiner

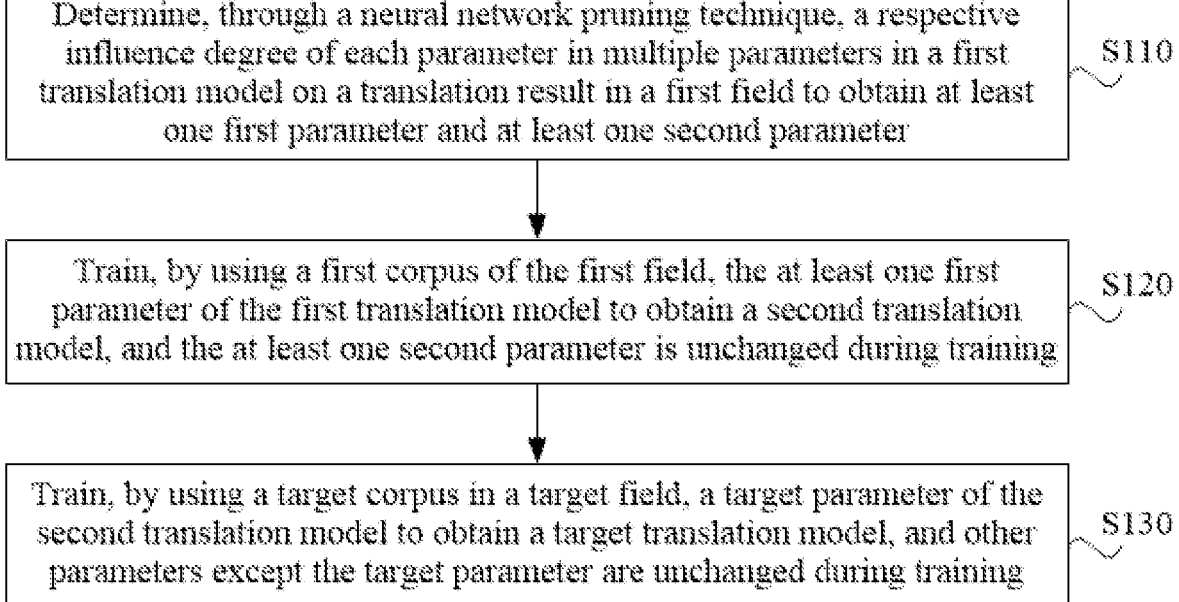

Determine, through a neural network pruning technique, a respective influence degree of each parameter in multiple parameters in a first translation model on a translation result in a first field to obtain at least one first parameter and at least one second parameter — S110

Train, by using a first corpus of the first field, the at least one first parameter of the first translation model to obtain a second translation model, and the at least one second parameter is unchanged during training — S120

Train, by using a target corpus in a target field, a target parameter of the second translation model to obtain a target translation model, and other parameters except the target parameter are unchanged during training — S130

FIG. 1

Input a second corpus of the first field into the first translation model to obtain a respective influence factor of the each parameter in the first translation model on a translation result — S210

Determine, according to the respective influence factor corresponding to the each parameter, a respective influence degree of the each parameter on the translation result — S220

Record a parameter whose influence degree is greater than or equal to a set threshold as the first parameter and a parameter whose influence degree is less than the set threshold as the second parameter — S230

Train, by using a first corpus of the first field, the at least one first parameter of the first translation model to obtain a second translation model, and the at least one second parameter is unchanged during training — S240

Train, by using a target corpus in a target field, a target parameter of the second translation model to obtain a target translation model, and other parameters except the target parameter are unchanged during training — S250

FIG. 2

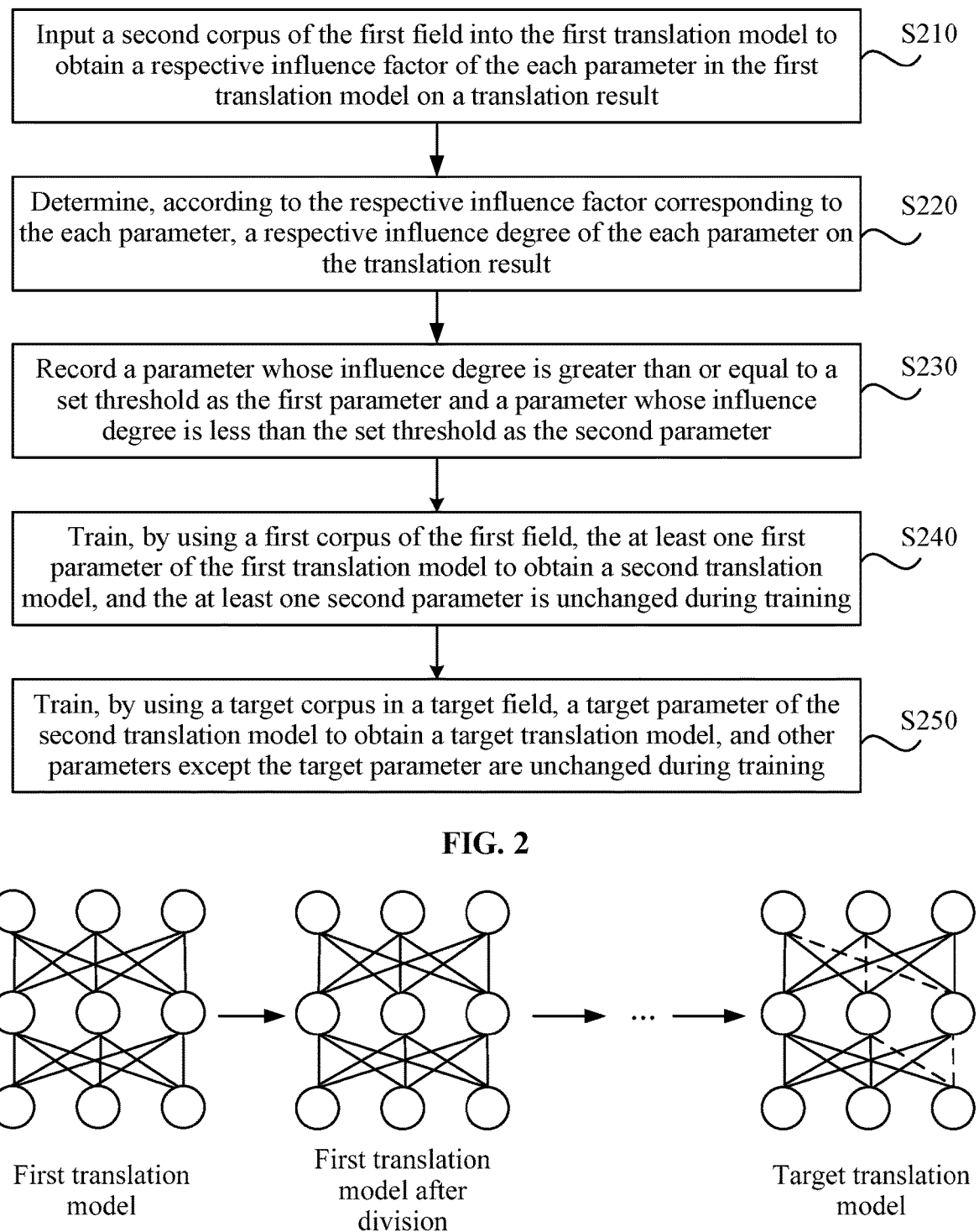

First translation model

First translation model after division

Target translation model

MODEL TRAINING METHOD AND APPARATUS, MACHINE TRANSLATION METHOD AND APPARATUS, AND DEVICE AND STORAGE MEDIUM

CROSS-REFERENCE TO RELATED APPLICATIONS

This is a National Stage Application filed under 35 U.S.C. 371 based on International Patent Application No. PCT/CN2021/131073, filed on Nov. 17, 2021, which claims priority to Chinese Patent application Ser. No. 20/201, 1412735.7 filed on Dec. 4, 2020, disclosures of both of which are incorporated herein by reference in their entireties.

TECHNICAL FIELD

The present disclosure relates to the field of computer technologies, for example, a model training method and apparatus, a machine translation method and apparatus, a device, and a storage medium.

BACKGROUND

Machine translation, also known as automatic translation, is a process of converting a natural language into another natural language by using a computer. Typically, machine translation is to translate a natural language through a trained machine translation model.

The machine translation model, during training, often has the following problems: There is a relatively large difference in the size of the corpus in different fields. For example, in the general field such as news, the bilingual corpus in this field is relatively easy to obtain due to a large amount of news and a wide range of sources. In the specific field such as novels, however, it is difficult to obtain a large-scale high-quality corpus due to the limitation of field characteristics, and the acquisition process also requires a lot of manpower and material resources.

Therefore, how to train the machine translation model according to the application field of corpus to improve the accuracy of the machine translation model is of great significance to machine translation.

SUMMARY

The present disclosure provides a model training method and apparatus, a machine translation method and apparatus, a device, and a storage medium.

The present disclosure provides a model training method. The method includes the steps described below.

Through a neural network pruning technique, a respective influence degree of each parameter in a plurality of parameters in a first translation model on a translation result in a first field is determined to obtain at least one first parameter and at least one second parameter. The influence degree of a first parameter on the translation result in the first field is greater than the influence degree of a second parameter on the translation result in the first field.

By using a first corpus of the first field, the at least one first parameter of the first translation model is trained to obtain a second translation model. The at least one second parameter is unchanged during training. The similarity between a translation result of the second translation model in the first field and a translation result of the first translation model in the first field meets a preset condition.

By using a target corpus in a target field, a target parameter of the second translation model is trained to obtain a target translation model. Other parameters except the target parameter are unchanged during training. The target parameter is part or all of the at least one second parameter.

The present disclosure also provides a machine translation method. The method includes the steps described below.

A source language text to be translated is acquired.

The source language text is input into a preset machine translation model. An output result of the preset machine translation model is acquired as a translation result of the source language text. The preset machine translation model is trained by the model training method described above.

The present disclosure also provides a model training apparatus. The apparatus includes a parameter determining module, a first translation model training module, and a second translation model training module.

The parameter determining module is configured to determine, through a neural network pruning technique, a respective influence degree of each parameter in a plurality of parameters in a first translation model on a translation result in a first field to obtain at least one first parameter and at least one second parameter. The influence degree of a first parameter on the translation result in the first field is greater than the influence degree of a second parameter on the translation result in the first field.

The first translation model training module is configured to train, by using a first corpus of the first field, the at least one first parameter of the first translation model to obtain a second translation model. The second parameter is unchanged during training. The similarity between a translation result of the second translation model in the first field and a translation result of the first translation model in the first field meets a preset condition.

The second translation model training module is configured to train, by using a target corpus in a target field, a target parameter of the second translation model to obtain a target translation model. Other parameters except the target parameter are unchanged during training. The target parameter is part or all of the at least one second parameter.

The present disclosure also provides a machine translation apparatus. The apparatus includes a text acquisition module and a translation module.

The text acquisition module is configured to acquire a source language text to be translated.

The translation module is configured to input the source language text into a preset machine translation model. An output result of the preset machine translation model is acquired as a translation result of the source language text. The preset machine translation model is trained by the model training method described above.

The present disclosure also provides an electronic device. The device includes one or more processors and a memory.

The memory is configured to store one or more programs.

The one or more programs, when executed by the one or more processors, implement the model training method described above or the machine translation method described above.

The present disclosure also provides a computer-readable storage medium storing a computer program which, when executed by a processor, causes the processor to implement the model training method described above or the machine translation method described above.

BRIEF DESCRIPTION OF DRAWINGS

FIG. 1 is a flowchart of a model training method according to an embodiment of the present disclosure.

FIG. 2 is a flowchart of a model training method according to an embodiment of the present disclosure.

FIG. 3 is a diagram illustrating the training process of a translation model according to an embodiment of the present disclosure.

DETAILED DESCRIPTION

Figure 4:
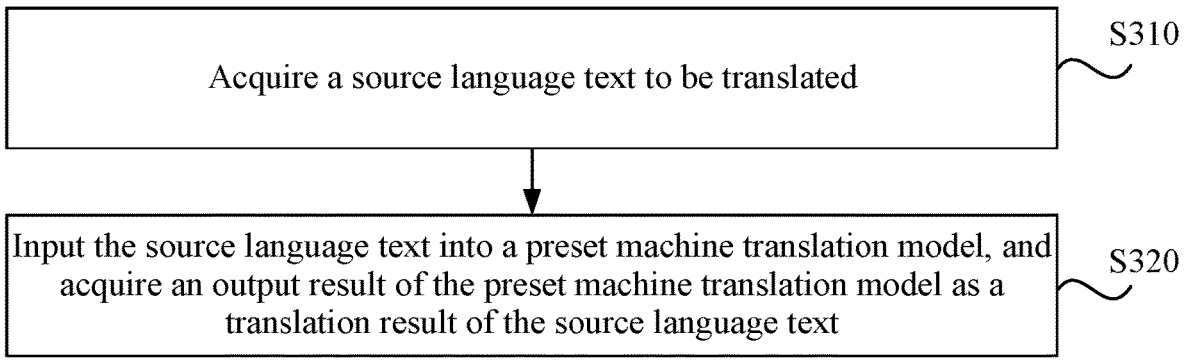
FIG. 4 is a flowchart of a machine translation method according to an embodiment of the present disclosure.

Embodiments of the present disclosure are described hereinafter with reference to the drawings. The drawings illustrate some embodiments of the present disclosure, but the present disclosure may be implemented in various manners and should not be construed as limited to the embodiments set forth herein. These embodiments are provided for a more thorough and complete understanding of the present disclosure. The drawings and embodiments of the present disclosure are merely illustrative.

Steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

Concepts such as "first" and "second" in the present disclosure are used to distinguish between fields, between parameters, or between modules and are not intended to limit these fields, parameters, or models.

"One" and "multiple" mentioned in the present disclosure are not limiting but illustrative and should be construed by those skilled in the art as "one or more" unless otherwise specified in the context.

The names of messages or information exchanged between multiple apparatuses in the embodiments of the present disclosure are used for illustrative purposes only and are not used to limit the scope of these messages or information.

FIG. 1 is a flowchart of a model training method according to an embodiment of the present disclosure. This embodiment is applicable to training a translation model. The trained translation model can be used to convert a natural language into another natural language to meet translation needs. The method may be performed by a model training apparatus. The apparatus may be implemented in software and/or hardware. The apparatus may be configured in an electronic device that may be a terminal having a data processing function, such as a mobile terminal like a mobile phone, a tablet, or a notebook, or may be a fixed terminal or a server such as a desktop computer. As shown in FIG. 1, the method includes the steps described below.

S110: Through a neural network pruning technique, a respective influence degree of each parameter in multiple parameters in a first translation model on a translation result in a first field is determined to obtain at least one first parameter and at least one second parameter.

The influence degree of the first parameter on the translation result in the first field is greater than the influence degree of the second parameter on the translation result in the first field. For example, the first translation model may be a general translation model that can meet the translation needs of the first field. The first field may be a general field. Generally, a field capable of acquiring a large-scale corpus can be referred to as a general field, for example, a news field. The general translation model may be constructed based on a neural network whose structure is not limited by this embodiment. The general translation model may be pre-trained based on a parallel corpus in the general field. The parallel corpus includes source statements and target statements that belong to different languages. The trained general translation model can meet translation needs in the general field.

An example is illustrated where the first translation model is used as a general translation model. The general translation model constructed based on the neural network generally contains multiple parameters. Some of the parameters have a greater influence on the translation result. For example, when the parameters are fine-tuned, the translation result changes greatly. Some of the parameters have a smaller influence on the translation result. For example, even if the parameters are adjusted in a large range, the translation result is basically unchanged. In an example, through a neural network pruning technique, a respective influence degree of each parameter in the general translation model on the translation result can be determined to obtain at least one first parameter and at least one second parameter. The neural network pruning technique can effectively prevent overfitting. To meet the translation needs of a specific field, it is conventional to retrain all parameters of the general translation model based on the general translation model and by using a fine-tune technique and the corpus of the specific field. However, overfitting easily occurs, and resultantly, the translation effect in the general translation is obviously reduced after the specific field self-adapts. In this embodiment, the neural network pruning technique is used to process the general translation model, and the respective influence degree of each parameter on the translation result in the general field is determined. Then at least one first parameter and at least one second parameter are obtained according to the influence degrees. In this manner, the problem of over-fitting can be effectively solved during subsequent model training based on the at least one first parameter and the at least one second parameter.

The influence degree can be understood as the degree of influence. This embodiment may record a parameter whose influence degree on a translation result is greater than or equal to a set threshold as the first parameter and a parameter whose influence degree on the translation result is less than the set threshold as the second parameter. Optionally, tuning can be used to determine the corresponding change in the translation result when each parameter changes. The respective influence degree of each parameter on the translation result can be determined according to the change in the translation result. A training corpus may also be input into the general translation model. The general translation model outputs a respective influence factor of each parameter on the translation result. The respective influence factor is used as the respective influence degree corresponding to each parameter. The respective influence degree of each parameter on the translation result may, of course, be determined in other manners, which is not limited in this embodiment.

S120: By using a first corpus of the first field, the at least one first parameter of the first translation model is trained to obtain a second translation model. The at least one second parameter is unchanged during training.

The similarity between a translation result of the second translation model in the first field and a translation result of the first translation model in the first field meets a preset condition. The first corpus may be a parallel corpus in the general field, including a source language text and a corresponding target language text, such as bilingual papers or bilingual masterpieces.

To prevent overfitting during the training, in this embodiment, some parameters of the general translation model are trained by using the first corpus. For example, the parameter that has a greater influence on the translation results, namely, the first parameter, may be trained. Optionally, the similarity between the translation result output by the model when the at least one first parameter is trained and the translation result output by the first translation model may be determined for the same source language text. When the similarity meets a preset condition, the current model is recorded as the second translation model. The preset condition may be a condition where it is indicated that the translation results of the second translation model and the first translation model are the same or similar. For example, the similarity may be greater than a set threshold. The size of the set threshold may be determined according to actual conditions. During the entire training process, only at least one first parameter is updated, and at least one second parameter remains unchanged.

S130: By using a target corpus in a target field, a target parameter of the second translation model is trained to obtain a target translation model. Other parameters except the target parameter are unchanged during training.

The target parameter is part or all of at least one second parameter. The target field of this embodiment may be a specific field with a small parallel corpus. Optionally, some or all of the second parameters may be selected as the parameters to be trained in the target field. The target parameters are trained by using the target corpus in the target field to obtain the target translation model. The target translation model not only retains the information in the general field but also increases the information from the target field. Therefore, the target translation model can be applied to the general field to translate the corpus therein and to the target field to translate the corpus therein. Thus, the field self-adaptability of the model is improved, and the translation effect in multiple fields is ensured. In training the second translation model, only the target parameter is updated, and parameters except the target parameter remain unchanged. For example, when the target parameters are all the second parameters, only at least one second parameter is updated, and at least one first parameter remains unchanged. When the target parameters are part of the second parameters, only the target parameters are updated, and parameters except the target parameters in the second parameters and at least one first parameter remain unchanged. The training process is similar to that of the first parameter.

The embodiment of the present disclosure provides a model training method. Through a neural network pruning technique, a respective influence degree of each parameter in a first translation model on a translation result in a first field is determined to obtain at least one first parameter and at least one second parameter. The influence degree of a first parameter on the translation result in the first field is greater than the influence degree of a second parameter on the translation result in the first field. By using a first corpus of the first field, at least one first parameter of the first translation model is trained to obtain a second translation model. The at least one second parameter is unchanged during training. The similarity between a translation result of the second translation model in the first field and a translation result of the first translation model in the first field meets a preset condition. By using a target corpus in a target field, a target parameter of the second translation model is trained to obtain a target translation model. Other parameters except the target parameter are unchanged during training. The target parameter is part or all of at least one second parameter. In the preceding scheme, the corpus in the first field is used to train the first parameter having a greater influence on the translation result in the first field. The second parameter is kept unchanged during the training. After the training is finished, under the condition that the first parameter is unchanged, the corpus in the target field is used to train the second parameter having a smaller influence on the translation result in the first field. In this manner, the finally obtained target translation model not only retains information in the first field but also increases information from the target field so that the target translation model can be applied to the first field and the target field. Thus, the field self-adaptability and the accuracy of the target translation model are improved, and when the target translation model is used for translation, the accuracy of translation results is improved.

FIG. 2 is a flowchart of a model training method according to an embodiment of the present disclosure. This embodiment is described based on the preceding embodiment. Referring to FIG. 2, the method may include the steps described below.

S210: A second corpus of the first field is input into the first translation model to obtain a respective influence factor of the each parameter in the first translation model on a translation result.

The second corpus may be a parallel corpus in the selected general field for determining the respective influence degree of each parameter in the first translation model on the translation result. The second corpus and the first corpus may be the same or different. In this embodiment, when the first translation model translates a source language text, the respective influence factor of each parameter in the model on the translation result can be output simultaneously. The influence factor is used to represent the influence degree of each parameter on the translation result. The larger the influence factor is, the greater the influence degree of the corresponding parameter on the translation result is, and vice versa.

S220: According to the respective influence factor corresponding to the each parameter, a respective influence degree of the each parameter on the translation result is determined.

In an example, the respective influence factor may be directly taken as the respective influence degree of each parameter on the translation result. For example, when the influence factor corresponding to a parameter is 0.6, the influence degree of the parameter on the translation result is considered to be 0.6. In an example, each parameter may be assigned a corresponding weight according to the respective influence factor corresponding to each parameter. The respective influence degree of each parameter on the translation result is determined according to the weight and the influence factor. For example, if the influence factor corresponding to a parameter is 0.5 and the corresponding weight is 0.1, the influence degree of the parameter on the translation result may be as follows: 0.5*0.1=0.05. The respective weight corresponding to each parameter may be determined according to the size of the influence factor. The larger the influence factor is, the larger the corresponding weight is. The sum of the weights corresponding to multiple parameters is 1.

S230: A parameter whose influence degree is greater than or equal to a set threshold is recorded as the first parameter, and a parameter whose influence degree is less than the set threshold is recorded as the second parameter.

Optionally, a threshold may be set in advance for dividing the parameters. A parameter whose influence degree is greater than or equal to the set threshold is recorded as the first parameter, and a parameter whose influence degree is less than the set threshold is recorded as the second parameter. The size of the set threshold may be determined according to actual conditions. This embodiment divides the parameters according to the respective influence degree of each parameter on the translation result so that the model can be applied to different fields simultaneously, and the field self-adaptability of the model is improved. Moreover, because different parameters correspond to different fields, only some parameters are needed to be trained when training is performed in a certain field, thereby improving the training efficiency of the model.

S240: By using a first corpus of the first field, the at least one first parameter of the first translation model is trained to obtain a second translation model. The at least one second parameter is unchanged during training.

In an example, the first parameter of the first translation model can be trained in the following manner:

A first source language text in the first field and a first reference translated text corresponding to the first source language text are acquired. The first source language text is input into the first translation model to obtain an output result of the first translation model. A matching degree between the output result and the first reference translated text is determined.

If the matching degree is less than a first set threshold, the at least one first parameter of the first translation model is adjusted until the matching degree of the output result and the first reference translated text is greater than or equal to the first set threshold, and the first translation model corresponding to the matching degree greater than or equal to the first set threshold is recorded as the second translation model.

The first source language text in this embodiment may be a text used in the general field for training the first parameter of the general translation model. This embodiment does not limit the language type of the text. The first reference translated text is a standard translated text of the first source language text. The language type of the first source language text is different from that of the first reference translated text. The first source language text and the first reference translated text may be acquired from a parallel corpus. The parallel corpus may include multiple parallel linguistic data. The matching degree may be the degree of matching between the translation result output by the general translation model and the first reference translated text. The higher the matching degree is, the closer the translation result output by the general translation model is to the first reference translated text. The general translation model of this embodiment, while outputting the translation result, may output the matching degree between the translation result and the first reference translated text.

A first source language text may be input into the general translation model to obtain an output result of the general translation model as the translation result of the first source language text. Moreover, the general translation model may determine a matching degree between the translation result and the first reference translated text and then compare the matching degree with the first set threshold. If the matching degree is less than the first set threshold, the first parameter of the general translation model is tuned until the matching degree between the output translation result and the first reference translated text is greater than or equal to the first set threshold. At this time, the current general translation model can be recorded as the second translation model. For the general field, the translation effect of the second translation model is the same as or similar to that of the first translation model. Compared with the conventional method where the model is obtained by training all parameters, this embodiment can achieve the same or similar translation effect as the conventional model by training some parameters, thereby reducing the calculation amount and improving the training efficiency of the model. During the entire training process, only at least one first parameter is updated, and at least one second parameter remains unchanged.

S250: By using a target corpus in a target field, a target parameter of the second translation model is trained to obtain a target translation model. Other parameters except the target parameter are unchanged during training.

In an example, the target parameter of the second translation model can be trained in the following manner:

A second source language text in the target field and a second reference translated text corresponding to the second source language text are acquired. The second source language text is input into the second translation model to obtain an output result of the second translation model. A matching degree between the output result and the second reference translated text is determined. If the matching degree is less than a second set threshold, the target parameter of the second translation model is adjusted until the matching degree of the output result and the second reference translated text is greater than or equal to the second set threshold, and the second translation model corresponding to the matching degree greater than or equal to the second set threshold is recorded as the target translation model.

The second source language text in this embodiment may be a text used in the target field for training the second parameter of the second translation model. This embodiment does not limit the language type of the text. The second reference translated text is a standard translated text of the second source language text. The language type of the second source language text is different from that of the second reference translated text. The second source language text and the second reference translated text may also be acquired from a parallel corpus. During the entire training process, only the target parameter of the second translation model is updated, and other parameters remain unchanged. Other training processes may refer to that of the first parameter. The details are not repeated herein. The size of the second set threshold may also be set according to actual situations. The target translation model obtained by this embodiment can be applied to the general field and the target field, improves the translation effect of the target field while ensuring the translation effect of the general field, and effectively solves the problem of overfitting caused by training all parameters in the conventional method.

For example, referring to FIG. 3, FIG. 3 is a diagram illustrating the training process of a translation model according to the embodiment of the present disclosure. First, a general corpus may be selected in a general field to be input into a first translation model. Through a neural network pruning technique, a respective influence degree of each parameter in multiple parameters in a first translation model on a translation result in a first field is determined to obtain at least one first parameter and at least one second parameter. The bold solid line in the second figure of FIG. 3 indicates the parameter that has a greater influence on the translation result, that is, the first parameter. The unbold solid line indicates the parameter that has a smaller influence on the translation result, that is, the second parameter. Then, the first parameter can be trained by using the first corpus in the general field to obtain a second translation model. The target parameter of the second translation model is trained by using the target corpus in the target field to obtain a target translation model. FIG. 3 uses an example where the target parameters are part of the second parameters. The dashed line indicates the target parameter. The target translation model retains not only the information of the general field, but also the information of the target field. Moreover, only a small number of parameters are involved in the field self-adaptability training. In this manner, the problem of overfitting in the conventional method is effectively solved, the translation effect of the target field is improved, and it is ensured that the translation effect of the general field does not decrease.

The embodiment of the present disclosure provides a model training method. Based on the preceding embodiments, at least one first parameter and at least one second parameter are obtained according to the respective influence degree of each parameter on the translation result. The at least one first parameter is trained by using the corpus of the general field. Then some or all of the second parameters are trained by using the corpus of the target field so that the finally obtained model retains both the information of the general field and the information of the target field, and translation effect of multiple fields is ensured.

FIG. 4 is a flowchart of a machine translation method according to an embodiment of the present disclosure. This embodiment is applicable to converting a natural language into another natural language. The method may be performed by a machine translation apparatus. The apparatus may be implemented in software and/or hardware. The apparatus may be configured in an electronic device that may be a terminal having a data processing function, such as a mobile terminal like a mobile phone, a tablet, or a notebook, or may be a fixed terminal or a server such as a desktop computer. As shown in FIG. 4, the method includes the steps described below.

S310: A source language text to be translated is acquired.

The source language text may be a source language text of a general field or may be a source language text of a target field.

S320: The source language text is input into a preset machine translation model. An output result of the preset machine translation model is acquired as a translation result of the source language text.

The preset machine translation model is trained by any model training method provided by embodiments of the present disclosure.

According to the machine translation method provided by embodiments of the present disclosure, a preset machine translation model is obtained by using the model training method provided by embodiments of the present invention. When translation is performed based on the preset machine translation model, the translation effect in a specific field is improved, the translation effect in a general field is ensured, and multi-field translation needs are met.

Figure 5:
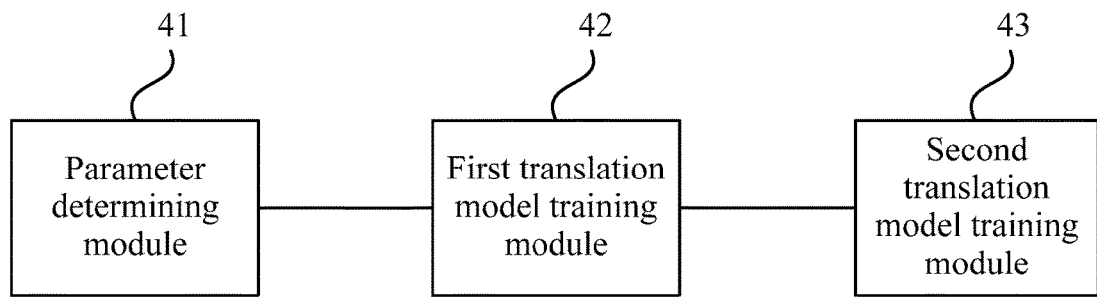
FIG. 5 is a diagram illustrating the structure of a model training apparatus according to an embodiment of the present disclosure.

FIG. 5 is a diagram illustrating the structure of a model training apparatus according to an embodiment of the present disclosure. This apparatus may perform the model training method provided by the preceding embodiments. Referring to FIG. 5, the apparatus may include a parameter determining module 41, a first translation model training module 42, and a second translation model training module 43.

The parameter determining module 41 is configured to determine, through a neural network pruning technique, a respective influence degree of each parameter in multiple parameters in a first translation model on a translation result in a first field to obtain at least one first parameter and at least one second parameter. The influence degree of a first parameter on the translation result in the first field is greater than the influence degree of a second parameter on the translation result in the first field. The first translation model training module 42 is configured to train, by using a first corpus of the first field, the at least one first parameter of the first translation model to obtain a second translation model. The at least one second parameter is unchanged during training. The similarity between a translation result of the second translation model in the first field and a translation result of the first translation model in the first field meets a preset condition. The second translation model training module 43 is configured to train, by using a target corpus in a target field, a target parameter of the second translation model to obtain a target translation model. Other parameters except the target parameter are unchanged during training. The target parameter is part or all of the at least one second parameter.

The embodiment of the present disclosure provides a model training apparatus. Through a neural network pruning technique, a respective influence degree of each parameter in multiple parameters in a first translation model on a translation result in a first field is determined to obtain at least one first parameter and at least one second parameter. The influence degree of a first parameter on the translation result in the first field is greater than the influence degree of a second parameter on the translation result in the first field. By using a first corpus of the first field, the at least one first parameter of the first translation model is trained to obtain a second translation model. The at least one second parameter is unchanged during training. The similarity between a translation result of the second translation model in the first field and a translation result of the first translation model in the first field meets a preset condition. By using a target corpus in a target field, a target parameter of the second translation model is trained to obtain a target translation model. Other parameters except the target parameter are unchanged during training. The target parameter is part or all of the at least one second parameter. In the preceding scheme, the corpus in the first field is used to train the first parameter having a greater influence on the translation result in the first field. The second parameter is kept unchanged during the training. After the training is finished, under the condition that the first parameter is unchanged, the corpus in the target field is used to train the second parameter having a smaller influence on the translation result in the first field. In this manner, the finally obtained target translation model not only retains information in the first field but also increases information from the target field so that the target translation model can be applied to the first field and the target field. Thus, the field self-adaptability and the accuracy of the target translation model are improved, and when the target translation model is used for translation, the accuracy of translation results is improved.

Based on the preceding embodiments, the parameter determining module 41 is configured to perform the following steps:

A second corpus of the first field is input into the first translation model to obtain a respective influence factor of the each parameter in the first translation model on a translation result. According to the respective influence factor corresponding to the each parameter, a respective influence degree of the each parameter on the translation result is determined. A parameter whose influence degree is greater than or equal to a set threshold is recorded as the first parameter, and a parameter whose influence degree is less than the set threshold is recorded as the second parameter.

Based on the preceding embodiments, the first translation model training module 42 is configured to perform the following steps:

A first source language text in the first field and a first reference translated text corresponding to the first source language text are acquired. The first source language text is input into the first translation model to obtain an output result of the first translation model. A matching degree between the output result and the first reference translated text is determined. If the matching degree is less than a first set threshold, the at least one first parameter of the first translation model is adjusted until the matching degree of the output result and the first reference translated text is greater than or equal to the first set threshold, and the first translation model corresponding to the matching degree greater than or equal to the first set threshold is recorded as the second translation model.

Based on the preceding embodiments, the second translation model training module 43 is configured to perform the following steps:

A second source language text in the target field and a second reference translated text corresponding to the second source language text are acquired. The second source language text is input into the second translation model to obtain an output result of the second translation model. A matching degree between the output result and the second reference translated text is determined. If the matching degree is less than a second set threshold, the target parameter of the second translation model is adjusted until the matching degree of the output result and the second reference translated text is greater than or equal to the second set threshold, and the second translation model corresponding to the matching degree greater than or equal to the second set threshold is recorded as the target translation model.

Based on the preceding embodiments, the first translation model is a generic translation model, the first field is a generic field, and the target field is a specific field.

The model training apparatus provided in embodiments of the present disclosure and the model training methods provided in the preceding embodiments belong to the same concept. For technical details not described in detail in this embodiment, reference may be made to the preceding embodiments, and this embodiment has the same effect as the model training methods executed.

Figure 6:
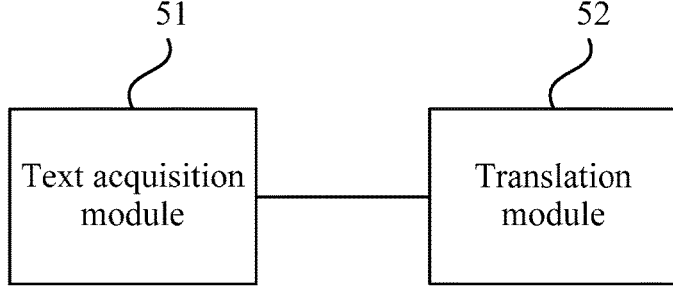
FIG. 6 is a diagram illustrating the structure of a machine translation apparatus according to an embodiment of the present disclosure.

FIG. 6 is a diagram illustrating the structure of a machine translation apparatus according to an embodiment of the present disclosure. This apparatus may perform the machine translation method provided by the preceding embodiments. Referring to FIG. 6, the apparatus may include a text acquisition module 51 and a translation module 52.

The text acquisition module 51 is configured to acquire a source language text to be translated. The translation module 52 is configured to input the source language text into a preset machine translation model. An output result of the preset machine translation model is acquired as a translation result of the source language text.

The preset machine translation model is trained by any model training method provided by embodiments of the present disclosure.

According to the machine translation apparatus provided by embodiments of the present disclosure, a preset machine translation model is obtained by using the model training method provided by embodiments of the present invention. When translation is performed based on the preset machine translation model, the translation effect in a specific field is improved, the translation effect in a general field is ensured, and multi-field translation needs are met.

Based on the preceding embodiments, the source language text includes the source language text in the general field or the source language text in the target field.

The machine translation apparatus provided in embodiments of the present disclosure and the machine translation methods provided in the preceding embodiments belong to the same concept. For technical details not described in detail in this embodiment, reference may be made to the preceding embodiments, and this embodiment has the same effect as the machine translation methods executed.

Figure 7:
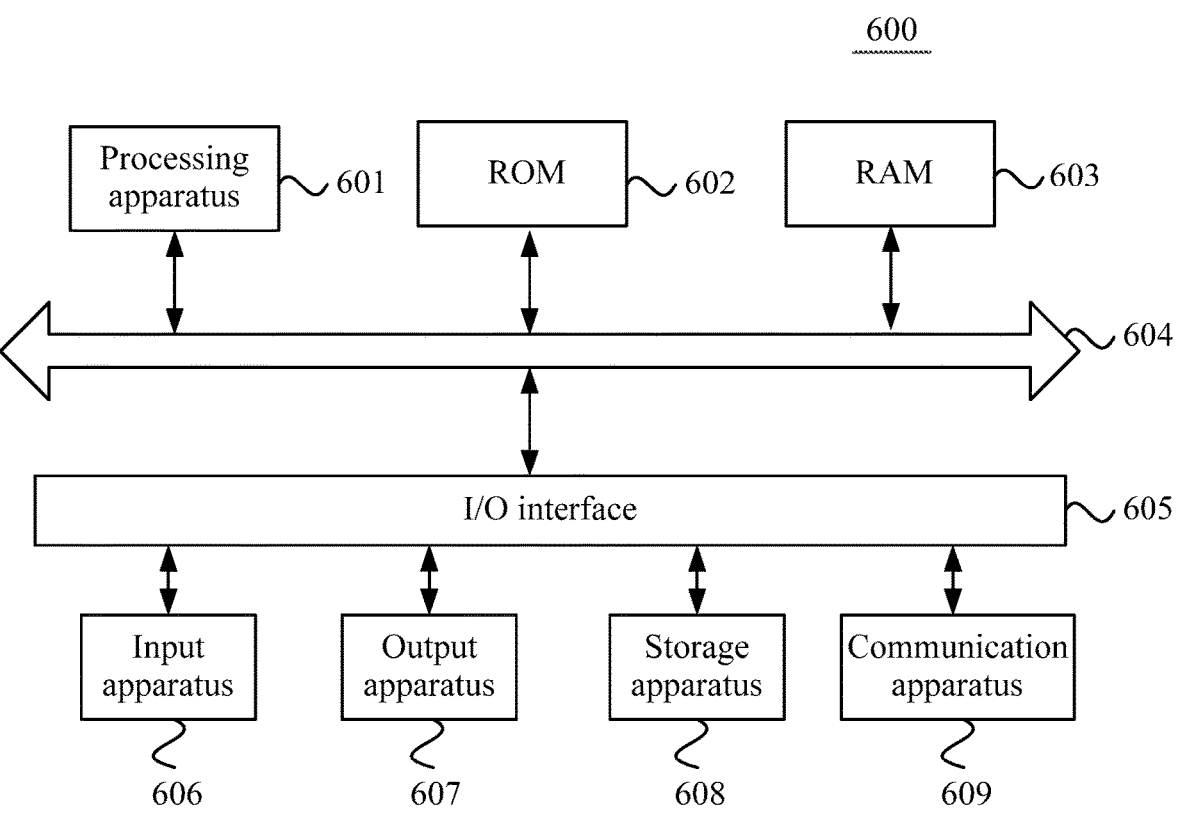
FIG. 7 is a diagram illustrating the structure of an electronic device according to an embodiment of the present disclosure.

Referring to FIG. 7, FIG. 7 is a diagram illustrating the structure of an electronic device 600 applicable to implementing the embodiments of the present disclosure. The electronic device in the embodiments of the present disclosure may include but is not limited to, a mobile terminal such as a mobile phone, a laptop, a digital broadcast receiver, a personal digital assistant (PDA), a PAD, a portable media player (PMP), and a vehicle-mounted terminal (for example, a vehicle-mounted navigation terminal) and a fixed terminal such as a digital TV, a desktop computer, and a server. The electronic device shown in FIG. 7 is merely an example and should not impose any limitation to the function and usage scope of this embodiment of the present disclosure.

As shown in FIG. 7, the electronic device 600 may include a processing apparatus 601 (such as a central processing unit or a graphics processor). The processing apparatus 601 may perform various appropriate actions and processing according to a program stored in a read-only memory (ROM) 602 or a program loaded into a random access memory (RAM) 603 from a storage apparatus 608. The RAM 603 also stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatus may be connected to the I/O interface 605: an input apparatus 606 such as a touch screen, a touch pad, a keyboard, a mouse, a camera, a microphone, an accelerometer, and a gyroscope; an output apparatus 607 such as a liquid crystal display (LCD), a speaker, and a vibrator; a storage apparatus 608 such as a magnetic tape and a hard disk; and a communication apparatus 609. The communication apparatus 609 may allow the electronic device 600 to perform wireless or wired communication with other devices to exchange data. FIG. 7 shows the electronic device 600 having various apparatuses, but it is not necessary for 600 to implement or be equipped with all the shown apparatuses. Optionally, the electronic device 600 may implement or be equipped with more or fewer apparatuses.

According to this embodiment of the present disclosure, the process described above with reference to the flowchart may be implemented as a computer software program. For example, this embodiment of the present disclosure includes a computer program product. The computer program product includes a computer program carried in a non-transitory computer-readable medium. The computer program includes program codes for performing the method shown in the flowchart. In such an embodiment, the computer program may be downloaded and installed from the network through the communication apparatus 609, or may be installed from the storage apparatus 608, or may be installed from the ROM 602. When the computer program is executed by the processing apparatus 601, the preceding functions defined in the methods of the embodiments of the present disclosure are performed.

The preceding computer-readable medium of the present disclosure may be a computer-readable signal medium, a computer-readable storage medium, or any combination of the computer-readable signal medium and the computer-readable storage medium. The computer-readable storage medium may be, but is not limited to, an electrical, magnetic, optical, electromagnetic, infrared, or semiconductor system, apparatus, or device, or any combination thereof. Examples of the computer-readable storage media may include, but are not limited to, an electrical connection with one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a base band or as a part of a carrier wave. Computer-readable program codes are carried in the data signal. Such propagated data signals may take a variety of forms, including, but not limited to, electromagnetic signals, optical signals, or any suitable combination thereof. The computer-readable signal medium may also be any computer-readable medium other than a computer-readable storage medium. The computer-readable signal medium may send, propagate, or transmit a program used by or in conjunction with an instruction execution system, apparatus, or device. The program codes contained on the computer-readable medium may be transmitted on any suitable medium, including, but not limited to, a wire, an optical cable, radio frequency (RF), or any suitable combination thereof.

In some embodiments, the client and the server can communicate by using any currently known or future-developed network protocol such as HyperText Transfer Protocol (HTTP) and can be interconnected by any form or medium of digital data communication (for example, a communication network). Examples of the communication network include a local area network (LAN), a wide area network (WAN), an interconnected network (for example, the Internet), an end-to-end network (for example, an ad hoc end-to-end network), and any currently known or future-developed network.

The preceding computer-readable medium may be included in the preceding electronic device, or may exist alone without being assembled into the electronic device.

The preceding computer-readable medium carries one or more programs. When executing the one or more programs, the electronic device performs the following steps: Through a neural network pruning technique, a respective influence degree of each parameter in multiple parameters in a first translation model on a translation result in a first field is determined to obtain at least one first parameter and at least one second parameter. The influence degree of a first parameter on the translation result in the first field is greater than the influence degree of a second parameter on the translation result in the first field. By using a first corpus of the first field, the at least one first parameter of the first translation model is trained to obtain a second translation model. The at least one second parameter is unchanged during training. The similarity between a translation result of the second translation model in the first field and a translation result of the first translation model in the first field meets a preset condition. By using a target corpus in a target field, a target parameter of the second translation model is trained to obtain a target translation model. Other parameters except the target parameter are unchanged during training. The target parameter is part or all of the at least one second parameter.

The preceding computer-readable medium carries one or more programs. When executing the one or more programs, the electronic device performs the following steps: A source language text to be translated is acquired. The source language text is input into a preset machine translation model. An output result of the preset machine translation model is acquired as a translation result of the source language text. The preset machine translation model is trained by any model training method provided by embodiments of the present disclosure.

Computer program codes for performing the operations in the present disclosure may be written in one or more programming languages or combination thereof. The preceding one or more programming languages include but are not limited to object-oriented programming languages such as Java, Smalltalk, and C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The flowcharts and block diagrams in the drawings show possible architectures, functions, and operations of the system, method, and computer program product according to the multiple embodiments of the present disclosure. In this regard, each block in the flowcharts or block diagrams may represent a module, a program segment, or part of codes that include one or more executable instructions for implementing specified logical functions. It is also to be noted that in some alternative implementations, the functions noted in the blocks may take an order different from the order noted in the drawings. For example, two sequential blocks may, in fact, be executed substantially in parallel, or sometimes executed in the reverse order, which depends on the involved functions. It is also to be noted that each block of the block diagrams and/or flowcharts and combinations of blocks in the block diagrams and/or flowcharts may be implemented by not only a specific-purpose hardware-based system that performs a specified function or action, but also a combination of specific-purpose hardware and computer instructions.

The described modules involved in the embodiments of the present disclosure may be implemented by software or hardware. The name of a module is not intended to limit the module in a certain circumstance. For example, the parameter determination module can also be described as "a module determining, through a neural network pruning technique, a respective influence degree of each parameter in multiple parameters in a first translation model on a translation result in a first field to obtain at least one first parameter and at least one second parameter".

The functions described herein above may be performed at least in part by one or more hardware logic components. For example, without limitation, exemplary types of hardware logic components that may be used include Field Programmable Gate Array (FPGA), Application Specific Integrated Circuit (ASIC), Application Specific Standard Product (ASSP), System on Chips (SOC), and Complex Programmable Logical device (CPLD).

In the context of the present disclosure, a machine-readable medium may be a tangible medium that may contain or store a computer program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Examples of the machine-readable storage medium may include an electrical connection based on one or more wires, a portable computer disk, a hard disk, a RAM, a ROM, an erasable programmable read-only memory (EPROM or flash memory), an optical fiber, a CD-ROM, an optical storage device, a magnetic storage device, or any appropriate combination thereof.

According to one or more embodiments of the present disclosure, the present disclosure provides a model training method. The method includes the steps described below.

Through a neural network pruning technique, a respective influence degree of each parameter in multiple parameters in a first translation model on a translation result in a first field is determined to obtain at least one first parameter and at least one second parameter. The influence degree of a first parameter on the translation result in the first field is greater than the influence degree of a second parameter on the translation result in the first field. By using a first corpus of the first field, the at least one first parameter of the first translation model is trained to obtain a second translation model. The at least one second parameter is unchanged during training. The similarity between a translation result of the second translation model in the first field and a translation result of the first translation model in the first field meets a preset condition. By using a target corpus in a target field, a target parameter of the second translation model is trained to obtain a target translation model. Other parameters except the target parameter are unchanged during training. The target parameter is part or all of the at least one second parameter.

In the model training methods provided by the present disclosure according to one or more embodiments of the present disclosure, determining, by the neural network pruning technique, the respective influence degree of the each parameter in the multiple parameters in the first translation model on the translation result in the first field to obtain the at least one first parameter and the at least one second parameter includes the steps described below.

A second corpus of the first field is input into the first translation model to obtain a respective influence factor of the each parameter in the first translation model on a translation result. According to the respective influence factor corresponding to the each parameter, a respective influence degree of the each parameter on the translation result is determined. A parameter whose influence degree is greater than or equal to a set threshold is recorded as the first parameter, and a parameter whose influence degree is less than the set threshold is recorded as the second parameter.

In the model training methods provided by the present disclosure according to one or more embodiments of the present disclosure, training, by using the first corpus of the first field, the at least one first parameter of the first translation model to obtain the second translation model includes the steps described below.

A first source language text in the first field and a first reference translated text corresponding to the first source language text are acquired. The first source language text is input into the first translation model to obtain an output result of the first translation model. A matching degree between the output result and the first reference translated text is determined. If the matching degree is less than a first set threshold, the first parameter of the first translation model is adjusted until the matching degree of the output result and the first reference translated text is greater than or equal to the first set threshold, and the first translation model corresponding to the matching degree greater than or equal to the first set threshold is recorded as the second translation model.

In the model training methods provided by the present disclosure according to one or more embodiments of the present disclosure, training, by using the target corpus in the target field, the target parameter of the second translation model to obtain the target translation model includes the steps described below.

A second source language text in the target field and a second reference translated text corresponding to the second source language text are acquired. The second source language text is input into the second translation model to obtain an output result of the second translation model. A matching degree between the output result and the second reference translated text is determined. If the matching degree is less than a second set threshold, the target parameter of the second translation model is adjusted until the matching degree of the output result and the second reference translated text is greater than or equal to the second set threshold, and the second translation model corresponding to the matching degree greater than or equal to the second set threshold is recorded as the target translation model.

In the model training methods provided by the present disclosure according to one or more embodiments of the present disclosure, the first translation model is a generic translation model, and the first field is a generic field.

According to one or more embodiments of the present disclosure, the present disclosure provides a machine translation method. The method includes the steps described below.

A source language text to be translated is acquired. The source language text is input into a preset machine translation model. An output result of the preset machine translation model is acquired as a translation result of the source language text. The preset machine translation model is trained by any model training method provided by embodiments of the present disclosure.

According to one or more embodiments of the present disclosure, the present disclosure provides a model training apparatus. The apparatus includes a parameter determining module, a first translation model training module, and a second translation model training module.

The parameter determining module is configured to determine, through a neural network pruning technique, a respective influence degree of each parameter in multiple parameters in a first translation model on a translation result in a first field to obtain at least one first parameter and at least one second parameter. The influence degree of a first parameter on the translation result in the first field is greater than the influence degree of a second parameter on the translation result in the first field. The first translation model training module is configured to train, by using a first corpus of the first field, the at least one first parameter of the first translation model to obtain a second translation model. The at least one second parameter is unchanged during training. Similarity between a translation result of the second translation model in the first field and a translation result of the first translation model in the first field meets a preset condition. The second translation model training module is configured to train, by using a target corpus in a target field, a target parameter of the second translation model to obtain a target translation model. Other parameters except the target parameter are unchanged during training. The target parameter is part or all of the at least one second parameter.

According to one or more embodiments of the present disclosure, the present disclosure provides a machine translation apparatus. The apparatus includes a text acquisition module and a translation module.

The text acquisition module is configured to acquire a source language text to be translated. The translation module is configured to input the source language text into a preset machine translation model. An output result of the preset machine translation model is acquired as a translation result of the source language text. The preset machine translation model is trained by any model training method provided by embodiments of the present disclosure.

According to one or more embodiments of the present disclosure, the present disclosure provides an electronic device. The device includes one or more processors and a memory.

The memory is configured to store one or more programs. The one or more programs, when executed by the one or more processors, implement any one of the model training methods or machine translation methods provided in the present disclosure.

According to one or more embodiments of the present disclosure, the present disclosure provides a computer-readable storage medium storing a computer program which, when executed by a processor, causes the processor to implement any one of the model training methods or machine translation methods provided in the present disclosure.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. A model training method, comprising:
determining, through a neural network pruning technique, a respective influence degree of each parameter in a plurality of parameters in a first translation model on a translation result in a first field to obtain at least one first parameter and at least one second parameter, wherein an influence degree of a first parameter on the translation result in the first field is greater than an influence degree of a second parameter on the translation result in the first field, the first translation model is a generic translation model, and the first field is a generic field;
training, by using a first corpus of the first field, the at least one first parameter of the first translation model to obtain a second translation model, wherein the at least one first parameter is updated and the at least one second parameter is unchanged during training, and similarity between a translation result of the second translation model in the first field and a translation result of the first translation model in the first field meets a preset condition; and
training, by using a target corpus in a target field, a target parameter of the second translation model to obtain a target translation model, wherein the target parameter is updated and other parameters except the target parameter in the second translation model are unchanged during training, the target parameter is part or all of the at least one second parameter, and the target field is a specific field.

2. The method of claim 1, wherein determining, through the neural network pruning technique, the respective influence degree of the each parameter in the plurality of parameters in the first translation model on the translation result in the first field to obtain the at least one first parameter and the at least one second parameter, comprises:
inputting a second corpus of the first field into the first translation model to obtain a respective influence factor of the each parameter in the first translation model on a translation result;
determining, according to the respective influence factor corresponding to the each parameter, a respective influence degree of the each parameter on the translation result; and
recording a parameter whose influence degree is greater than or equal to a set threshold as a first parameter and recording a parameter whose influence degree is less than the set threshold as a second parameter.

3. The method of claim 1, wherein training, by using the first corpus of the first field, the at least one first parameter of the first translation model to obtain the second translation model, comprises:
acquiring a first source language text in the first field and a first reference translated text corresponding to the first source language text;
inputting the first source language text into the first translation model to obtain an output result of the first translation model; and
determining a matching degree between the output result and the first reference translated text;
in a case where the matching degree is less than a first set threshold, adjusting the at least one first parameter of the first translation model until the matching degree of the output result and the first reference translated text is greater than or equal to the first set threshold, and recording the first translation model corresponding to the matching degree greater than or equal to the first set threshold as the second translation model.

4. The method of claim 1, wherein training, by using the target corpus in the target field, the target parameter of the second translation model to obtain the target translation model, comprises:

acquiring a second source language text in the target field and a second reference translated text corresponding to the second source language text;

inputting the second source language text into the second translation model to obtain an output result of the second translation model; and determining a matching degree between the output result and the second reference translated text; in a case where the matching degree is less than a second set threshold, adjusting the target parameter of the second translation model until the matching degree of the output result and the second reference translated text is greater than or equal to the second set threshold, and recording the second translation model corresponding to the matching degree greater than or equal to the second set threshold as the target translation model.

5. A non-transitory computer-readable storage medium storing a computer program which, when executed by a processor, causes the processor to implement the model training method of claim 1.

6. A machine translation method, comprising:

acquiring a source language text to be translated; and inputting the source language text into a preset machine translation model, and acquiring an output result of the preset machine translation model as a translation result of the source language text, wherein the preset machine translation model is trained by a model training method, and the model training method comprises:

determining, through a neural network pruning technique, a respective influence degree of each parameter in a plurality of parameters in a first translation model on a translation result in a first field to obtain at least one first parameter and at least one second parameter, wherein an influence degree of a first parameter on the translation result in the first field is greater than an influence degree of a second parameter on the translation result in the first field, the first translation model is a generic translation model, and the first field is a generic field;

training, by using a first corpus of the first field, the at least one first parameter of the first translation model to obtain a second translation model, wherein the at least one first parameter is updated and the at least one second parameter is unchanged during training, and similarity between a translation result of the second translation model in the first field and a translation result of the first translation model in the first field meets a preset condition; and training, by using a target corpus in a target field, a target parameter of the second translation model to obtain a target translation model, wherein the target parameter is updated and other parameters except the target parameter in the second translation model are unchanged during training, the target parameter is part or all of the at least one second parameter, and the target field is a specific field.

7. The method of claim 6, wherein determining, through the neural network pruning technique, the respective influence degree of the each parameter in the plurality of parameters in the first translation model on the translation result in the first field to obtain the at least one first parameter and the at least one second parameter, comprises:

inputting a second corpus of the first field into the first translation model to obtain a respective influence factor of the each parameter in the first translation model on a translation result;

determining, according to the respective influence factor corresponding to the each parameter, a respective influence degree of the each parameter on the translation result; and recording a parameter whose influence degree is greater than or equal to a set threshold as a first parameter and recording a parameter whose influence degree is less than the set threshold as a second parameter.

8. The method of claim 6, wherein training, by using the first corpus of the first field, the at least one first parameter of the first translation model to obtain the second translation model, comprises:

acquiring a first source language text in the first field and a first reference translated text corresponding to the first source language text;

inputting the first source language text into the first translation model to obtain an output result of the first translation model; and determining a matching degree between the output result and the first reference translated text;

in a case where the matching degree is less than a first set threshold, adjusting the at least one first parameter of the first translation model until the matching degree of the output result and the first reference translated text is greater than or equal to the first set threshold, and recording the first translation model corresponding to the matching degree greater than or equal to the first set threshold as the second translation model.

9. The method of claim 6, wherein training, by using the target corpus in the target field, the target parameter of the second translation model to obtain the target translation model, comprises:

acquiring a second source language text in the target field and a second reference translated text corresponding to the second source language text;

inputting the second source language text into the second translation model to obtain an output result of the second translation model; and determining a matching degree between the output result and the second reference translated text;

in a case where the matching degree is less than a second set threshold, adjusting the target parameter of the second translation model until the matching degree of the output result and the second reference translated text is greater than or equal to the second set threshold, and recording the second translation model corresponding to the matching degree greater than or equal to the second set threshold as the target translation model.

10. A non-transitory computer-readable storage medium storing a computer program which, when executed by a processor, causes the processor to implement the machine translation method of claim 6.

11. An electronic device, comprising:

one or more processors; and a memory, which is configured to store one or more programs;

wherein the one or more programs, when executed by the one or more processors, perform steps, wherein the steps comprise:

determining, through a neural network pruning technique, a respective influence degree of each parameter in a plurality of parameters in a first translation model on a translation result in a first field to obtain at least one first parameter and at least one second parameter, wherein an influence degree of a first parameter on the translation result in the first field is greater than an influence degree of a second parameter on the translation result in the first field, the first translation model is a generic translation model, and the first field is a generic field;

training, by using a first corpus of the first field, the at least one first parameter of the first translation model to obtain a second translation model, wherein the at least one first parameter is updated and the at least one second parameter is unchanged during training, and similarity between a translation result of the second translation model in the first field and a translation result of the first translation model in the first field meets a preset condition; and training, by using a target corpus in a target field, a target parameter of the second translation model to obtain a target translation model, wherein the target parameter is updated and other parameters except the target parameter in the second translation model are unchanged during training, the target parameter is part or all of the at least one second parameter, and the target field is a specific field.

12. The electronic device of claim 11, wherein determining, through the neural network pruning technique, the respective influence degree of the each parameter in the plurality of parameters in the first translation model on the translation result in the first field to obtain the at least one first parameter and the at least one second parameter, comprises:

inputting a second corpus of the first field into the first translation model to obtain a respective influence factor of the each parameter in the first translation model on a translation result;

determining, according to the respective influence factor corresponding to the each parameter, a respective influence degree of the each parameter on the translation result; and recording a parameter whose influence degree is greater than or equal to a set threshold as a first parameter and recording a parameter whose influence degree is less than the set threshold as a second parameter.

13. The electronic device of claim 11, wherein training, by using the first corpus of the first field, the at least one first parameter of the first translation model to obtain the second translation model, comprises:

acquiring a first source language text in the first field and a first reference translated text corresponding to the first source language text;

inputting the first source language text into the first translation model to obtain an output result of the first translation model; and determining a matching degree between the output result and the first reference translated text;

in a case where the matching degree is less than a first set threshold, adjusting the at least one first parameter of the first translation model until the matching degree of the output result and the first reference translated text is greater than or equal to the first set threshold, and recording the first translation model corresponding to the matching degree greater than or equal to the first set threshold as the second translation model.

14. The electronic device of claim 11, wherein training, by using the target corpus in the target field, the target parameter of the second translation model to obtain the target translation model, comprises:

acquiring a second source language text in the target field and a second reference translated text corresponding to the second source language text;

inputting the second source language text into the second translation model to obtain an output result of the second translation model; and determining a matching degree between the output result and the second reference translated text;

in a case where the matching degree is less than a second set threshold, adjusting the target parameter of the second translation model until the matching degree of the output result and the second reference translated text is greater than or equal to the second set threshold, and recording the second translation model corresponding to the matching degree greater than or equal to the second set threshold as the target translation model.

* * * * *